US007853880B2

(12) United States Patent
Porter

(10) Patent No.: US 7,853,880 B2
(45) Date of Patent: Dec. 14, 2010

(54) DISPLAYING NETWORK PROPERTIES IN A GRAPHICAL USER INTERFACE

(75) Inventor: Kevin L. Porter, Nevada City, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 943 days.

(21) Appl. No.: 10/900,889

(22) Filed: Jul. 28, 2004

(65) Prior Publication Data
US 2006/0026509 A1 Feb. 2, 2006

(51) Int. Cl.
*G06F 3/00* (2006.01)
(52) U.S. Cl. .................................. 715/734; 715/738
(58) Field of Classification Search ................ 715/734, 715/735, 736, 737, 738, 969
See application file for complete search history.

(56) References Cited
U.S. PATENT DOCUMENTS

| | | | | |
|---|---|---|---|---|
| 5,933,599 A * | 8/1999 | Nolan | .................. | 715/734 |
| 6,112,015 A * | 8/2000 | Planas et al. | ................ | 709/223 |
| 6,567,849 B2 * | 5/2003 | Ludovici et al. | ............ | 709/223 |
| 6,968,505 B2 * | 11/2005 | Stoll et al. | .................. | 715/712 |
| 2003/0030662 A1 * | 2/2003 | Poisson et al. | .............. | 345/735 |
| 2003/0112958 A1 * | 6/2003 | Beaudoin et al. | ........ | 379/221.15 |
| 2004/0075680 A1 * | 4/2004 | Grace et al. | ................. | 345/734 |
| 2004/0199622 A1 * | 10/2004 | Huscher et al. | ............. | 709/223 |
| 2005/0086606 A1 * | 4/2005 | Blennerhassett et al. | .... | 715/760 |
| 2006/0181531 A1 * | 8/2006 | Goldschmidt | ............... | 345/440 |

* cited by examiner

*Primary Examiner*—Dennis Bonshock

(57) ABSTRACT

Network information can be represented by displaying one or more graphical components representing network entities in a first portion of a graphical user interface. An embedded browser is provided in a second portion of the graphical user interface. A selection of one of the graphical components is detected. In response to the selection, browser-compatible data is retrieved from a network entity corresponding to the selected graphical component, and the browser-compatible data is rendered in the embedded browser.

12 Claims, 5 Drawing Sheets

DISPLAYING NETWORK PROPERTIES IN A GRAPHICAL USER INTERFACE

FIELD OF THE INVENTION

The present disclosure relates to displaying network properties in a graphical user interface.

BACKGROUND

Computers have played an increasingly important role in all manners of business and personal activities. Along with the increased usage of personal computing has come various networks technologies used to connect the computers together. Computer networks have become as important as the computers themselves, providing users worldwide connectivity via infrastructures such as the Internet.

Networks can range in scale from just a few computers on a local area network (LAN) to worldwide network infrastructures such as a Global Area Network (GAN) (e.g., the Internet). Generally, the larger a network becomes, the more complex and difficult it is to manage. Managing networks includes checking current status of network devices and links, monitoring network performance to discover bottlenecks and other performance problems, configuring network devices to account for new equipment and topologies, etc.

If all network hardware and software is supplied by the same vendor, then a proprietary network management system may be used to maintain the network. A proprietary system can take full advantage of the hardware and software features provided by the vendor. However, it is rarely efficient for an enterprise to buy all hardware from the same vendor. As market conditions and technologies change, it is more cost effective to buy from different vendors to optimize performance and value. Also, having a diversity of hardware and software typically makes the network more robust. Therefore, standards have been developed to allow a wide diversity of network devices to be managed.

One of these standards is the Simple Network Management Protocol (SNMP). SNMP is an application layer protocol that facilitates the exchange of management information between network devices. SNMP enables network administrators to manage network performance, find and solve network problems, and plan for network growth. A network management tool may utilize an SNMP interface for easy configuration and control of network devices. The network management tool may make configuration easier by utilizing, for example, a graphical user interface (GUI).

Although many devices may be accessed and configured using SNMP and related protocols, many manufacturers will still want to provide custom features that are not easily adaptable to an existing SNMP framework. It is desirable, therefore, to provide ready access to these custom features from a network management tool.

SUMMARY

A method, system, and apparatus are disclosed for representing network activity. Network information can be represented by displaying one or more graphical components representing network entities in a first portion of a graphical user interface. An embedded browser is provided in a second portion of the graphical user interface. A selection of one of the graphical components is detected. In response to the selection, browser-compatible data is retrieved from a network entity corresponding to the selected graphical component, and the browser-compatible data is rendered in the embedded browser.

DETAILED DESCRIPTION

In the following description of various embodiments, reference is made to the accompanying drawings which form a part hereof, and in which is shown by way of illustration various example manners by which the invention may be practiced. It is to be understood that other embodiments may be utilized, as structural and operational changes may be made without departing from the scope of the present invention.

In general, the present disclosure relates to providing a graphical user interface (GUI) for identifying various properties of a computer network Graphical entities may be used to represent various network elements in the GUI. Data relating to those network elements can be displayed in the GUI via an embedded browser. The GUI may be included as part of a network management arrangement that provides status and control for networks.

Figure 1:
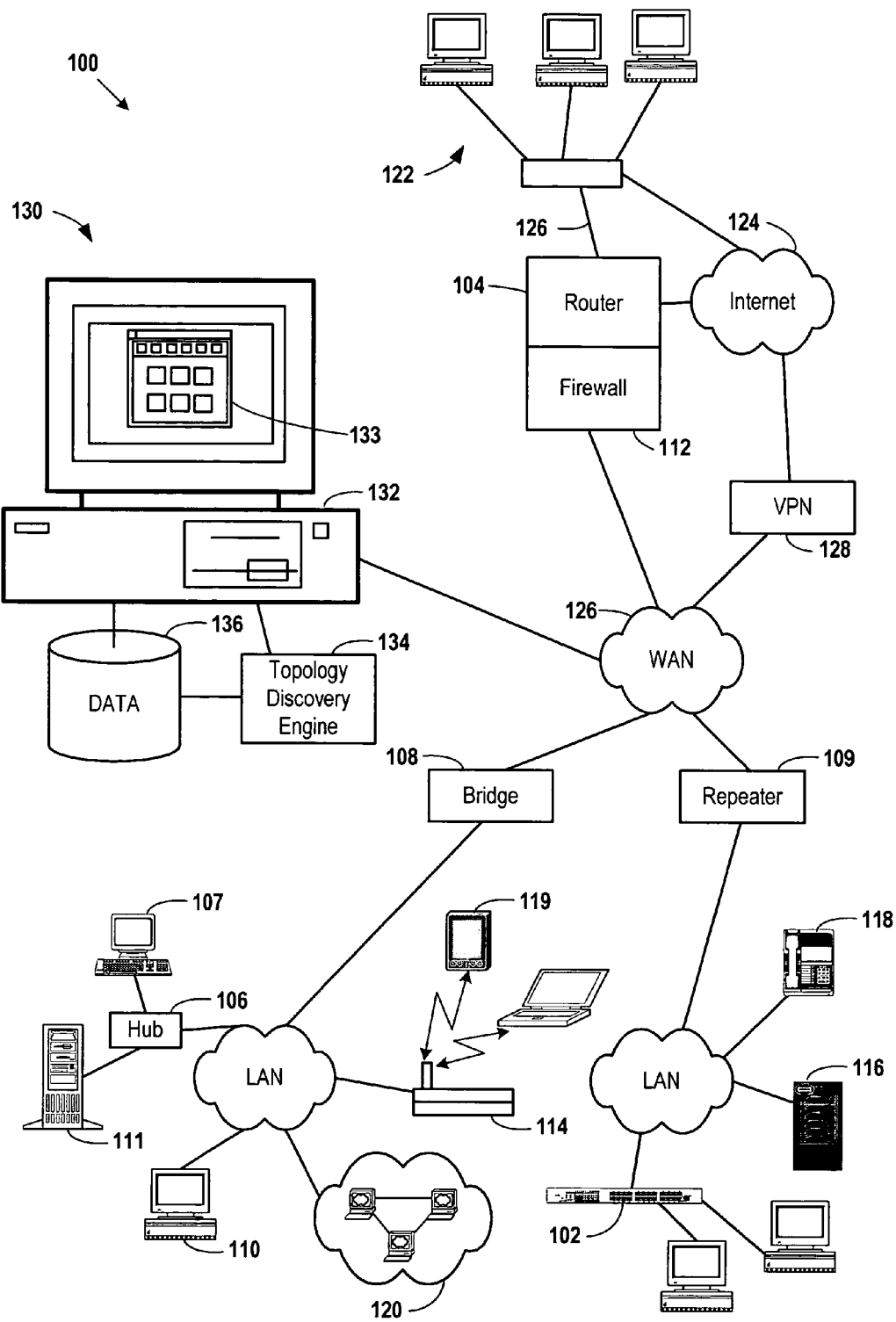
FIG. 1 illustrates a system using a network management tool according to an embodiment of the invention.

FIG. 1 shows a system 100 utilizing a network management arrangement according to an embodiment of the present invention. The system 100 may include any form of network, including a local area network (LAN) and wide area network (WAN). The network may include any combination of network data transfer hardware, data access media, network protocols, and end applications. The illustrated network includes such network entities as switches 102, routers 104, hubs 106, bridges 108, repeaters 109, terminals/thin clients 107, hosts 110, servers 111, firewalls 112, wireless access points 114, network storage devices 116, digital telecommunications devices 118 (e.g., network telephone and video teleconference devices), portable devices 119, clustered systems 120, etc.

The system may utilize any manner of data transfer medium, including electrical, optical, and wireless technologies. The network data may be transferred over any combination of protocols, including TCP/IP, UDP/IP, Ethernet, ATM, Token-Ring, Fiber-Channel, etc. The network may include data equipment located within the enterprise facilities, as well as remotely located data equipment. For example, a remote site network 122 may be accessible via the Internet 124, leased data lines 126, or other connection arrangements (e.g., dial up). The remote site network 122 may be directly coupled to the enterprise network, or may be accessed via a secure tunnel through the Internet. The latter may be provided by a Virtual Private Network (VPN) gateway 128.

The system 100 includes a network management arrangement 130 that is configured to provide system status and control functionality. The network management arrangement 130 includes a management terminal 132. The management terminal 132 includes a user interface (e.g., GUI 133) enabling a user to view status of the system 100. The user may also input data to the management terminal 132 (e.g., using keyboard, mouse) for controlling various aspects of the system 100. This control may include shutting down, starting up, and/or configuring network entities.

One or more network topology engines 134 may work in concert with the network management terminal 132 to gather network configuration and activity data and send commands to devices. The network topology engine 134 may gather network data using such protocols as Simple Network Management Protocol (SNMP), Cisco Discovery Protocol, (CDP), Foundry Discovery Protocol (FDP), Address Resolution Protocol (ARP) tables and ping sweeps. The network topology engine 134 may be included with the terminal 132, although the topology engine 134 more typically runs on a server. The network topology engine 134 may send data directly to the terminal 132 for display, or the network topology engine 134 may store data in an intermediate data storage entity, such as a database 136, for retrieval by the terminal 132.

It will be appreciated that many network entities can be accessed via the network for configuration. In a large network, it would be unmanageable to require physical access to all of the network hardware in order to configure the hardware. Therefore, the hardware manufacturer typically includes a network-accessible configuration interface.

Although some hardware may use proprietary interfaces for remote configuration access, it more common for the hardware to include standardized network protocol interfaces for this purpose. Typically, the interface is configured so that it can be accessed via a Web browser.

A Web browser is a program for graphically rendering content accessed via a network. Browsers mainly rely on the Hypertext Transfer Protocol (HTTP) over TCP/IP to download documents and other content. The documents are typically formatted using Hypertext Markup Language (HTML), although formats such as plain text and Extensible Markup Language (XML) may also be displayed in a browser.

Browsers are often adapted to utilize other protocols and formats besides HTTP and HMTL. For example, many browsers can access files using file transfer protocol (FTP). The data retrieved from FTP sites is typically rendered to appear as it would in a native filesystem GUI application (e.g., Windows™ Explorer and MacOS™ Finder). In another example, browsers may be able to interpret and run Javascript™ that is embedded in an HTML document.

Various extensions may be included in modern browsers to perform functions besides the rendering of HTML documents. These extensions may be included with the browser, and/or be added on via the use of "plug-ins." For example, browsers may be extended to render specially formatted graphical objects such as animated graphics interchange format (GIF) objects, Java™ applets, Macromedia™ Flash™ objects, ActiveX™ controls, etc.

The flexibility and ubiquity of browsers has made them indispensable tools for accessing all types of network entities. Many network hardware manufacturers provide configuration interfaces using browser-compatible data, such as HTML documents, GIF/JPEG graphical images, plug-ins, etc. Providing configuration interfaces in the form of browser-compatible data allows the network devices to be accessed by many network-coupled computers running a variety of operating systems. A stand-alone browser may be useful when included with the network management arrangement 130. However, there are still some inherent difficulties in utilizing a stand-alone browser in a custom designed network management application.

For example, a provider of network management software would like to have full integration of all network access functionality, thus presenting a unified "picture" via the GUI 134. By utilizing an embedded browser, the network management arrangement 130 can seamlessly integrate browser display and navigation with the other network management functionality.

Another problem with using stand-alone browsers has to do with non-standard Web interfaces. Although Web content is supposed to follow well-known and widely adopted standards, occasionally Web-accessible content does not comply with these standards. Various browsers deal with these incompatibilities in different ways; some handle the incompatibilities well, and others not so well. Therefore, there may be situations where utilizing the default browser on a network management terminal 132 may cause unpredictable results. The network management arrangement 130 can ensure compatible browser display by including an optimized, embedded browser in the GUI 134.

Although it may be fairly uncommon for the browser to incorrectly display network accessible content, a far more common occurrence is security holes in ever more feature-laden commercial browsers. Since most network devices will tend to use simplified interfaces, a simple, robust, and secure embedded browser can provide the desired functionality while ensuring the security of an important asset such as the network management arrangement 130.

Figure 2:
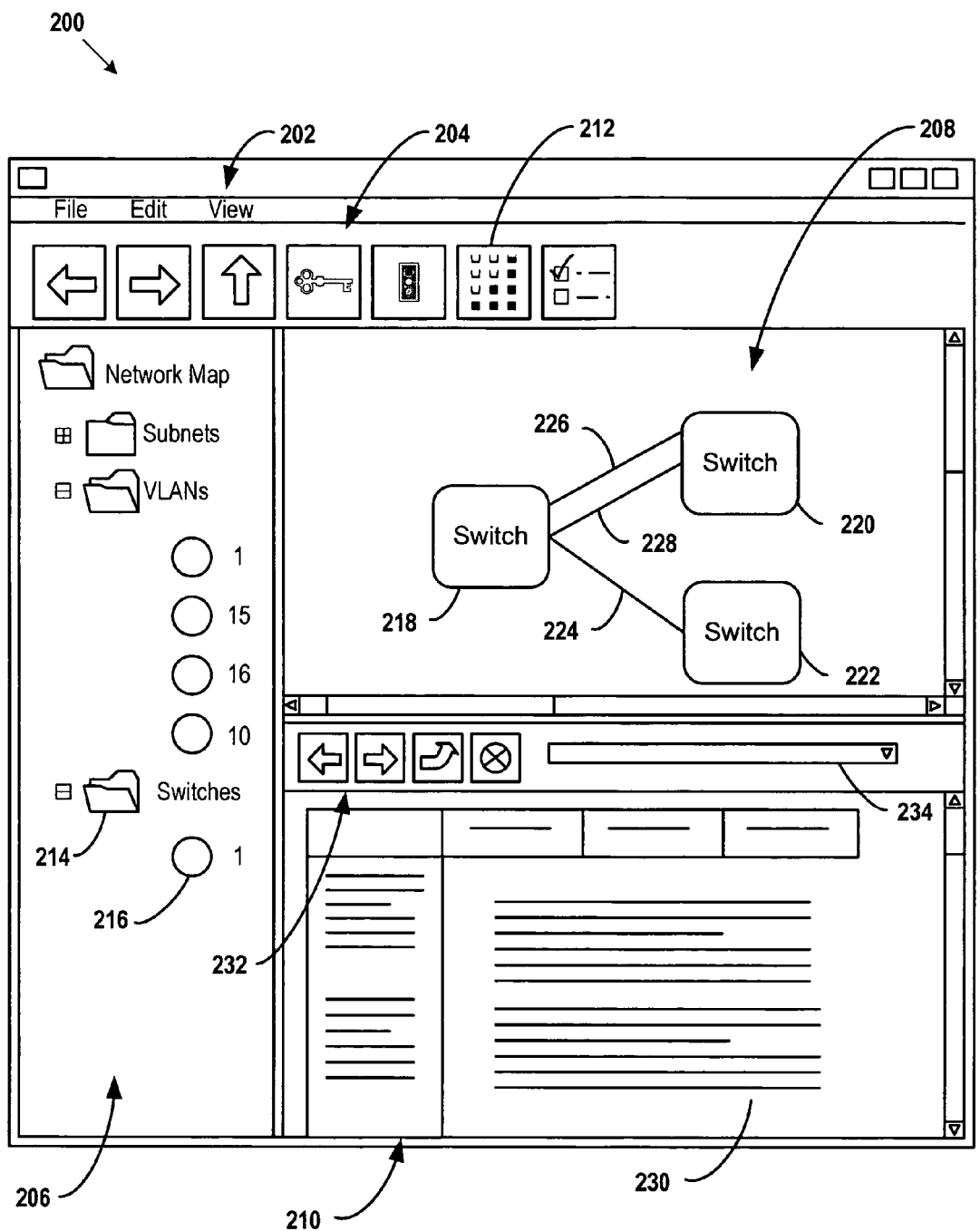
FIG. 2 illustrates a network management GUI according to an embodiment of the invention.

Turning now to FIG. 2, an example network management GUI 200 is shown with an embedded browser according to an embodiment of the present invention. The GUI 200 may be part of the main viewing window of a graphical network management tool. The GUI 200 may include various functional portions, including a menu 202, a toolbar 204, a hierarchical view 206, a map view 208, and a browser view 210.

The menu 202 and toolbar 204 may provide general functions known in the art, including setting configurations and preferences, application startup and exit, handing files, printing, etc. The menu 202 and toolbar 204 may also provide functions specific to other portions of the GUI 200. For example, the toolbar 204 may contain a sort button 212 for sorting graphical components in the hierarchical view 206 based on various characteristics.

The GUI 200 provides one or more graphical views of various aspects of the network. These aspects may be reflected in different graphical arrangements such as the hierarchical view 206 and the map view 208. The hierarchical view 206 includes graphic components that represent logical relations between network entities such groupings by physical location, network type, device type, network subdivisions (e.g., domains, subnetworks, etc.). The graphical components of the hierarchical view 206 are generally arranged in a tree structure. Logical relations illustrated by the hierarchical view 206 may include parent-child, genus-species, whole-part, type-instance, etc. Those aspects of hierarchical relations that do not map to physical objects may be represented as folders 214 while those relations that apply to physical objects may include a different representation such as the circle 216.

For example, the folder 214 may include a list of all the Ethernet switches on the network (i.e., a type-instance relationship). The concept of an Ethernet switch "type" does not map to a particular physical object, thus the folder 214 is the appropriate representation for the type. The individual switches do map to physical objects, so the circle 216 (or other image readily associated with the device) may be an appropriate representation.

Although it is possible that containers do not represented any physical object, it will be appreciated that in some situations containers can represent physical entities. For example, a rack of blade servers is a physical entity that may be monitored by a network management application (e.g., power and cooling status), and is also a container having a collection of computers. Therefore, the rack may be represented by either a folder or other icon as deemed appropriate, and the hierarchical view 206 may display subcomponents below the rack.

The map view 208 is generally directed to a different purpose than the hierarchical view 206. The map view 208 generally illustrates aspects of physical or virtual connectivity between network entities, as well as showing the entities themselves. For example the shapes/icons 218, 220, 222 may represent Ethernet switches of the network, and the lines 224, 226, 228 may represent logical or physical links between those entities.

In general, a logical/virtual link also requires an underlying physical link. Logical links that share the same physical link may be treated by various network entities as being on different physical links. For example, the links 226, 228 may appear as separate graphical elements (e.g., lines) in the map view 208 even though the actual data in both links 226, 228 is flowing through the same medium (e.g., wire or optical fiber). The switches 218, 220 may have the links 226, 228 mapped to separate virtual LANs (VLANs) so that the switches segregate the allowable destination of data based on which VLAN the data is associated with.

Although the hierarchical and map views 206, 208 may be directed to different aspects of network management, it is appreciated that the views may work in concert to provide easy manipulation of the views and control the display of information. For example, selecting a component in the hierarchical view 206 may cause devices associated with the selected component to appear centered in the map view 208. If the component selected in the hierarchical view 206 is a folder 214, then the map display may be limited/filtered to just show those components in the folder 214. In a similar manner, selecting one or more components on the map view 208 may cause those items to appear selected on the hierarchical view 206, thereby showing the hierarchical relations of the selected component.

The hierarchical and map views 206, 208 may also be tightly integrated with the browser view 210. The browser view 210 provides a rendering area 230 for rendering Web-based content such as HTML documents. The browser view 210 may include its own specialized controls, such as a navigation toolbar 232 and a text box 234 for viewing and/or entering a Universal Resource Locator (URL). It will be appreciated that some or all of these controls may be provided by other elements of the GUI 200, including the main toolbar 204 and/or menu 202.

The browser view 210 may be used similar to a standalone browser, where the user selects a bookmark or types in a URL, and the underlying software connects with the network entities, downloads requested data, and renders the data for display. Because the browser view 210 is integrated with the GUI 200, it may include interactions with other portions of the GUI, such as the hierarchical and map views 206, 208.

For example, a user may double-click a component in the map view 208 causing a communication to be sent to the browser view 210. This communication causes embedded browser software to connect to the network entity associated with the component and download a configuration page. This configuration page is then rendered in the browser view 210. Communications may also be sent from the browser view 210 to the map view 206. For example, a router's configuration page shown in the browser view 210 may provide access to second network entity connected to a port of the router. This access may be provided by selecting a hypertext link in the router configuration Web page. If a user selects this link, the browser view 210 connects to the second network entity and downloads a configuration page of the second network entity for display. The browser view 210 can also send a communication to the map view 206 so the component associated with the second network entity is shown centered and/or selected in the map view 206.

It will be appreciated that various aspects of operation can be streamlined by including a browser view 210 in the GUI 200. For example, most network entities require a password to access the configuration page. If a standalone browser is used to access these pages, the user may have to lookup and enter passwords, or deal with a password manager of the browser. However, the network management software may include a password manager for managing the various passwords needed to access the network entities. This password manager may be included as part of the GUI 200, or made accessible (e.g., by an application program interface) for use by the GUI 200. This password manager can also be used by the browser view 210 (and its underlying software) so that there is no further effort required to access the Web-based configuration pages of password-protected devices.

Figure 3:
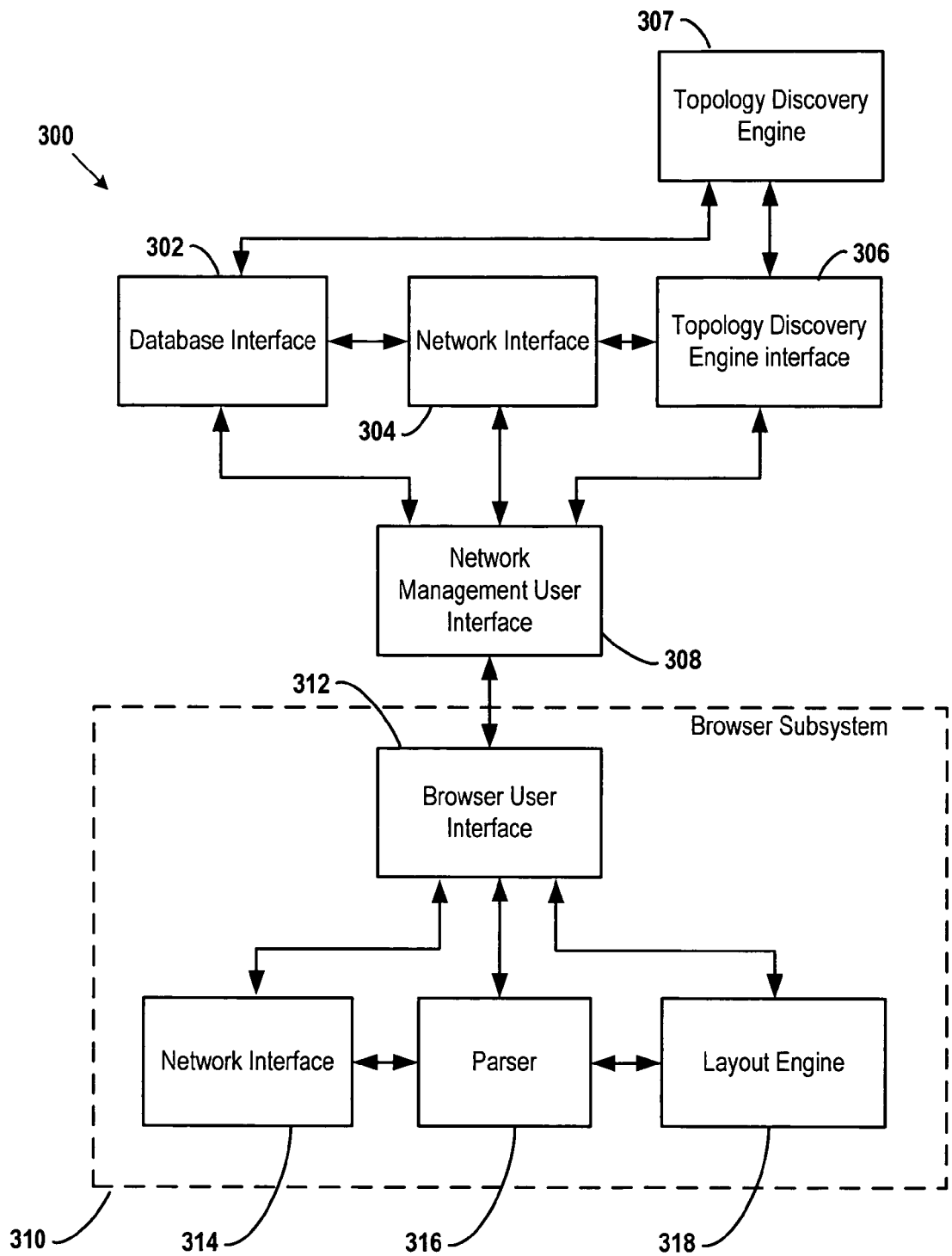
FIG. 3 illustrates a software architecture for a network management tool according to an embodiment of the invention.

Turning now to FIG. 3, an architecture diagram illustrates an example arrangement of network management software 300 according to an embodiment of the present invention. The general network management functions may be provided by a database interface 302, a network interface 304, a topology discovery engine interface 306, and a network management user interface 308. The network interface 304 may act as a general purpose interface used for transferring network data over a network device (e.g., an Ethernet card) as well as containing various protocol stacks (TCP/IP, HTTP, etc.) for enabling network interactions.

The database interface 302 typically includes methods for retrieving and storing network data via database tables. The database interface 302 may interface with a network database via the network interface 304, or interface with data on a locally attached drive. The database interface 302 may work in concert with the topology discovery engine interface 306 in accessing network status data generated by a topology discovery engine 307. The topology discovery engine 307 may run locally or remotely. A remotely running topology discovery engine 307 may be accessed via the network interface 304.

Network status is displayed via the network management user interface 308. The network management user interface 308 may display graphical components representing various aspects of the managed network. The network management user interface 308 may also include graphical components used for controlling various aspects of the software 300, including the database interface 302, the network interface 304, and the topology discovery engine interface 306

Also shown as part of the network management software 300 is a browser subsystem 310. The browser subsystem 310 includes a network interface 314 to establish connections to remote machines and retrieve the requested files. These files may be passed to the parser 316 which parses the files. The result of the parsed files may be used by the layout engine 318 to draw to the render area of the browser user interface 312.

The parser 316 is responsible for parsing the contents of requested files. The parser may recognize any combination of formats, including HTML, XML, and Javascript. The parser 316 may depend on the layout engine 318 to determine the orientation of a Web page. The layout engine 318 handles the presentation of Web page contents. The parser 316 and/or layout engine 318 may communicate with the network interface 314 in order to request additional files (e.g., images, cascading style sheets) that are needed to complete the page layout.

The network interface 314 handles the data flow across the networks. The network interface 314 may also maintain various state files such as the cache and "cookies." Files retrieved by the network interface 314 may be received as binary or text (e.g., ASCII) data. It will be appreciated that functionality of the network interface 314 may be provided in-whole or in-part by the software's main network interface 304.

Figure 4A:
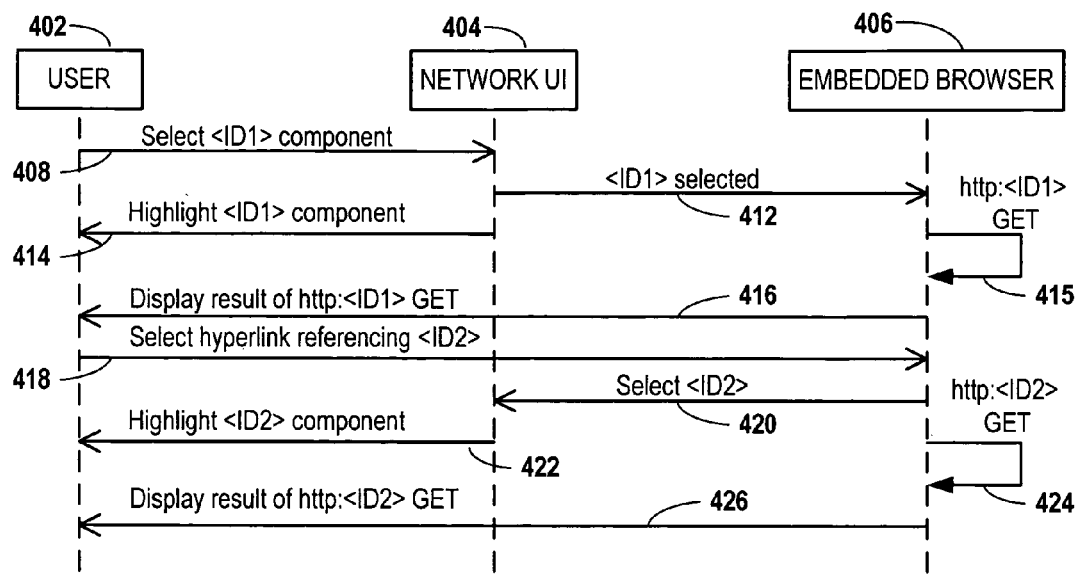
FIG. 4A illustrates an example sequence of communications between a network management GUI and an embedded browser according to an embodiment of the invention.

In general, the functional components shown in the example diagram of FIG. 3 may communicate with other components internal and/or external to the network management software 300 for purposes of network status and configuration. FIG. 4A illustrates certain interactions between a user 402, the components of network management user interface (UI) 404, and an embedded browser 406 according to an embodiment of the present invention. In one scenario, the user 402 selects (408) a component in the network management UI 404 that represents a network entity, identified here as "<ID1>." The identifier "<ID1>" may include any combination of a URL, hostname, IP address, local reference identifier, etc. Typically references to the network entity will be provided by a data structure (e.g., a class) that allows associating, for example, an internal reference name of the entity with one or more characteristics (e.g., hostname, URL, etc.) associated with the entity.

The network management UI 404 will typically have some internal tasks to complete when the user 402 selects (408) a component, such as highlighting (414) the component so that it is evident to the user 402 which entity is currently selected. The network management UI 404 may also communicate (412) the selection to the embedded browser 406 so that the browser 406 can take appropriate action for a selection.

In this example, one appropriate action for the browser 406 to take once it has been informed (412) of an object selection is to download Web data associated with that object. This download may occur using an HTTP GET command (414). The result of the GET command (415) is browser-compatible data (e.g., an HTML document) that can then be displayed (416) to the user 402.

The data displayed (416) by the embedded browser 408 may include hyperlinked objects such as text and graphics. In this example, the browser 408 may display a hyperlinked reference to another network entity (being referenced here as <ID2>), and the user 402 may select (418) this hyperlinked object.

The standard behavior for a browser 408 when hyperlinked objects are user-selected is to download (424) the data associated with the hyperlink and display (426) the data in the browser 408. The embedded browser 408 may also communicate (420) this selection to the network UI 404. The network UI 404 may respond by determining whether the referenced object corresponds to a currently displayed graphical component, and if so, highlight (422) the component.

Figure 4B:
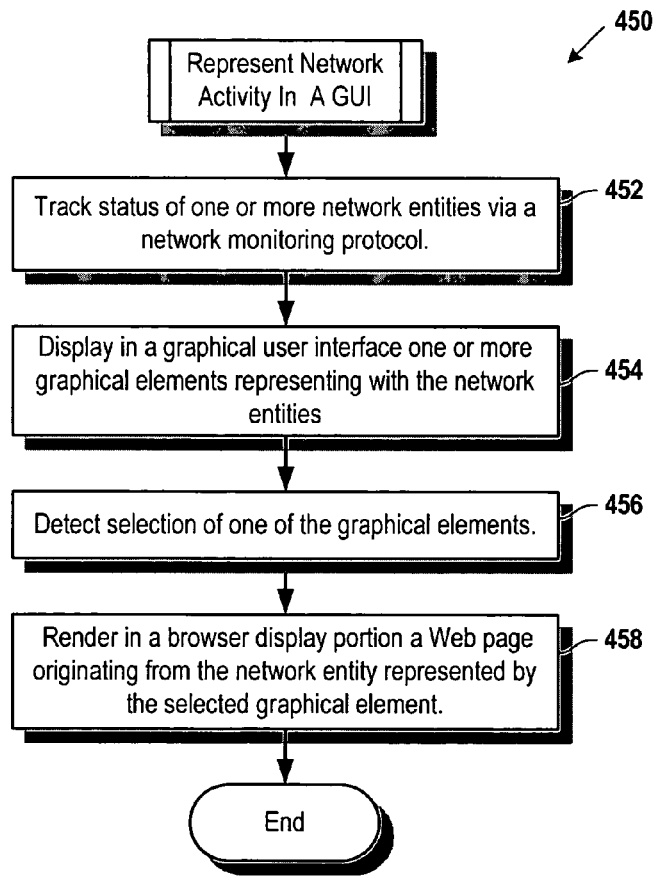
FIG. 4B illustrates a procedure for represent network activity in a GUI according to an embodiment of the invention.

Turning now to FIG. 4B, a flowchart 450 illustrates a procedure for representing network activity in a GUI according to an embodiment of the present invention. Status of one or more network entities is tracked (452) via a network monitoring protocol. A graphical user interface is displayed (454) with one or more graphical elements representing with the network entities. A selection of one of the graphical elements is detected (456). In response to the selection, a Web page originating from the network entity represented by the selected graphical element is rendered (458) in a browser display portion of the GUI.

Figure 5:
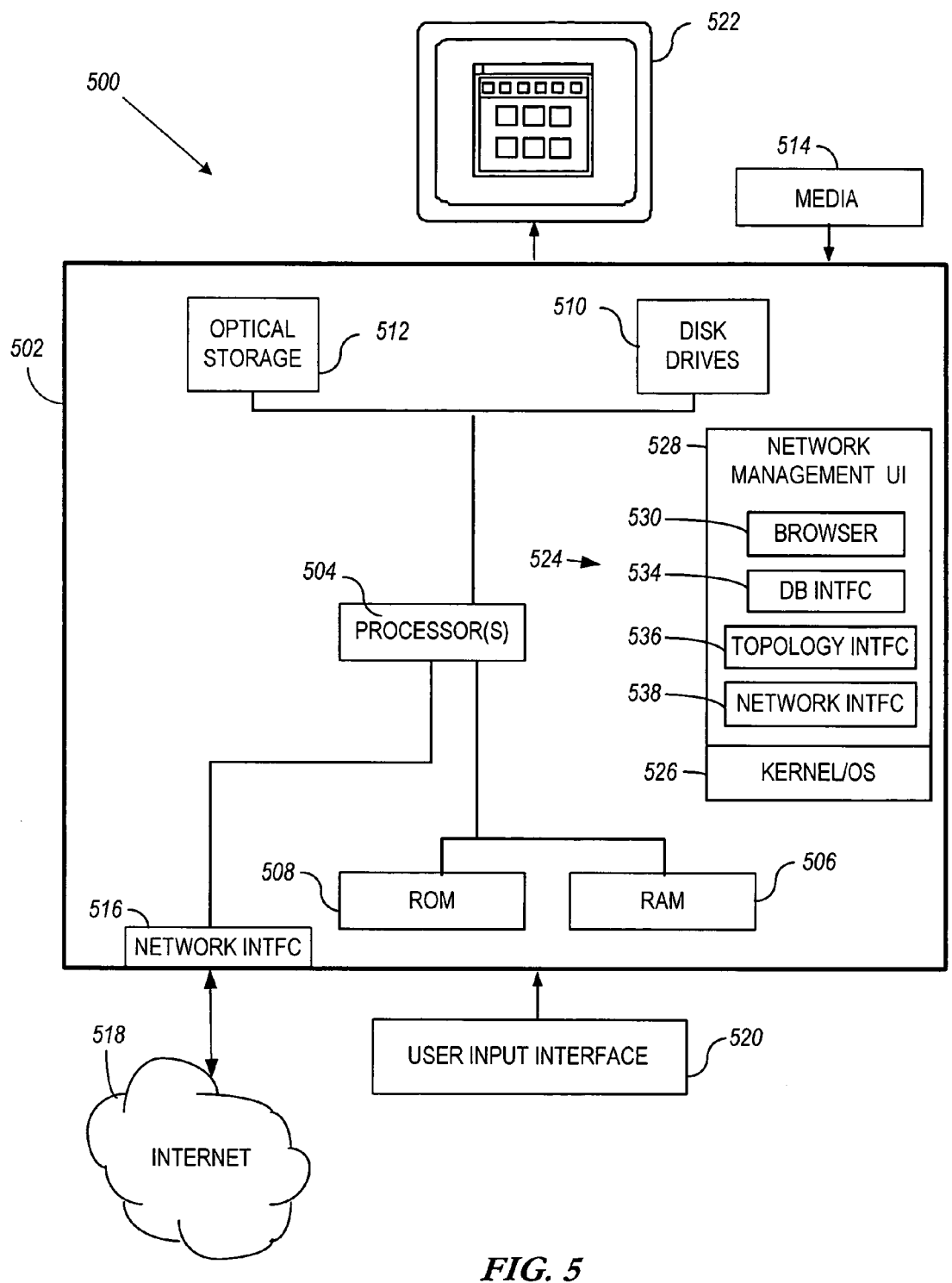
FIG. 5 illustrates an example computing arrangement incorporating a network management tool according to an embodiment of the invention.

In reference now to FIG. 5, a computing arrangement 500 is shown for providing a network management GUI according to an embodiment of the present invention. The computing arrangement 500 includes data processing hardware 502 that has one or more processors 504 coupled to various forms of memory. The processor(s) 504 are arranged to execute instructions stored on or provided by such memory. Memory accessible by the processor(s) may include random access memory (RAM) 506, read-only memory (ROM) 508, disk drives 510, optical storage 512 (e.g., CD-ROM, DVD), etc.

The processor(s) 504 may also access data via memory available on removable media 514, such as floppy disks, Zip disks, flash memory, etc. The processor(s) 504 may also execute instructions received via a network interface 516. The network interface 516 may be data coupled to any data transfer network such as a local area network (LAN), wide area network (WAN) or global area network (GAN) such as the Internet 518.

The data processing hardware 502 may include and/or be coupled to a user input interface 520 and an output device 522 (e.g., a monitor) for interacting with users. The data processing hardware 502 includes software 524 that may be provided in the form of instructions executable by the processor(s) 504. Generally, the software 524 includes an operating system 526 for the control and management of hardware 502 and basic system operations, as well as running applications. The operating system 526 may include any type of kernel (e.g., monolithic kernel, microkernel, exokernel, etc.) and user interface software such as a shell and/or graphical user interface (GUI). The operating system 526 includes facilities for running, via the processor(s) 504, a network management user interface 528.

The network management user interface 528 may be run as binary instructions via a shell or by interpreted instructions that are executed via an interpreter (e.g., a Java™ virtual machine). The network management user interface 528 may include any combination of an embedded browser 530, a database interface 534, a topology discovery interface 536, and a network interface 538. The embedded browser 530 may interact with any of the interfaces 534, 536, 538 as well as graphical components of the network management user interface 528 to retrieve, send, and display Web data of network entities.

It will be appreciated that the arrangement and composition of the hardware 502, software 524, and operating system 526 may differ from that described in relation to FIG. 5. It will be apparent to those skilled in the art that the descriptions provided herein of the network management user interface 528 and related software are independent of any particular configuration of the computing arrangement 500 or its operating environment.

From the description provided herein, those skilled in the art are readily able to combine hardware and/or software created as described with appropriate general purpose or system and/or computer subcomponents embodiments of the invention, and to create a system and/or computer subcomponents for carrying out the method embodiments of the invention. Embodiments of the present invention may be implemented in any combination of hardware and software.

The foregoing description of the example embodiments of the invention has been presented for the purposes of illustration and description. It is not intended to be exhaustive or to limit the invention to the precise form disclosed. Many modifications and variations are possible in light of the above teaching. It is intended that the scope of the invention not be limited with this detailed description, but rather the scope of the invention is defined by the claims appended hereto.

What is claimed is:

1. A method for displaying network information, comprising:
   displaying, by an application program, a window having a first toolbar with first web-browsing controls;
   displaying, by the application program, a first panel within the window, the first panel including a topology of a network including a plurality of network entities, the topology displayed within the first panel as a collapsible folder structure;
   displaying, by the application program, a second panel within the window, the second panel including a selected sub-plurality of the network entities displayed within the first panel, the selected sub-plurality displayed within the second panel such that each network entity of the selected sub-plurality is displayed as an object interconnected to other objects representing other network entities of the selected sub-plurality by lines;
   displaying, by an embedded web browsing program separate from the application program, a third panel within the window, the third panel including a second toolbar with second web-browsing controls, at least some of the second web-browsing controls being identical to the first web-browsing controls and a text box allowing for independent navigation to a different network entity;
   detecting, by the application program, a selection of a given object of the objects within the second panel;
   communicating a reference to the network entity represented by the given object from the application program to the embedded web browsing program;
   retrieving, by the embedded web browsing program, browser-compatible data from the network entity represented by the given object; and,
   rendering the browser-compatible data, by the embedded web browsing program, within the third panel; and
   in response to a selection of a given element within the third panel being detected by the embedded web browsing program:
   communicating the selection of the given element from the embedded web browsing program to the application program, the given element corresponding to a given network entity; and,
   modify the display of at least the object representing the given network entity within the second panel, by the application program.

2. The method of claim 1, wherein modify the display of at least the object representing the given network entity within the second panel comprises visually changing an appearance of at least the object within the second panel to indicate that the given network entity is in a selected state.

3. The method of claim 1, wherein affecting the display of at least the object representing the given network entity within the second panel comprises centering at least the object within the second panel.

4. A system comprising:
   a plurality of network entities;
   an application computer program to display a window having a first toolbar with first web-browsing controls, a first panel within the window that includes a topology of a network including the network entities as a collapsible folder structure, and a second panel within the window including a selected sub-plurality of the network entities displayed within the first panel such that each network entity of the selected sub-plurality is displayed as an object interconnected to other objects representing other network entities of the selected sub-plurality by lines; and,
   an embedded web browsing program separate from the application program to display a third panel within the window including a second toolbar with second web-browsing controls, where at least some of the second web-browsing controls are identical to the first web-browsing controls and a text box allowing for independent navigation to a different network entity;
   wherein responsive to the application program detecting a selection of a given object of the objects within the second panel,
      the application program is to communicate a reference to the network entity represented by the given object to the embedded web browsing program;
      the embedded web browsing program is to retrieve browser-compatible data from the network entity represented by the given object and is to render the browser-compatible data within the third panel; and
   wherein responsive to the embedded web browsing program detecting a selection of a given element within the third panel,
      the embedded web browsing program is to communicate the selection of the given element to the application program, the given element corresponding to a given network entity; and,
      the application program is to modify the display of at least the object representing the given network entity within the second panel.

5. The system of claim 4, wherein the application program is to modify the display of at least the object representing the given network entity within the second panel by visually changing an appearance of at least the object within the second panel to indicate that the given network entity is in a selected state.

6. The system of claim 4, wherein the application program is to modify the display of at least the object representing the given network entity within the second panel by centering at least the object within the second panel.

7. A processor-readable medium comprising a program storage device configured with instructions for causing a processor to perform a method via an application program and an embedded web browsing program, the method comprising:
   displaying, by the application program, a window having a first toolbar with first web-browsing controls;
   displaying, by the application program, a first panel within the window, the first panel including a topology of a network including a plurality of network entities, the topology displayed within the first panel as a collapsible folder structure;
   displaying, by the application program, a second panel within the window, the second panel including a selected sub-plurality of the network entities displayed within the first panel, the selected sub-plurality displayed within the second panel such that each network entity of the selected sub-plurality is displayed as an object interconnected to other objects representing other network entities of the selected sub-plurality by lines;
   displaying, by the embedded web browsing program separate from the application program, a third panel within the window, the third panel including a second toolbar with second web-browsing controls, at least some of the second web-browsing controls being identical to the first web-browsing controls and a text box allowing for independent navigation to a different network entity;

detecting, by the application program, a selection of a given object of the objects within the second panel;

communicating a reference to the network entity represented by the given object from the application program to the embedded web browsing program;

retrieving, by the embedded web browsing program, browser-compatible data from the network entity represented by the given object; and, rendering the browser-compatible data, by the embedded web browsing program, within the third panel; and wherein the method further comprises, in response to a selection of a given element within the third panel being detected by the embedded web browsing program:

communicating the selection of the given element from the embedded web browsing program to the application program, the given element corresponding to a given network entity; and, modify the display of at least the object representing the given network entity within the second panel, by the application program.

8. The medium of claim 7, wherein modify the display of at least the object representing the given network entity within the second panel comprises visually changing an appearance of at least the object within the second panel to indicate that the given network entity is in a selected state.

9. The medium of claim 7, wherein affecting the display of at least the object representing the given network entity within the second panel comprises centering at least the object within the second panel.

10. An apparatus comprising:

a plurality of network entities;

application means for displaying a window having a first toolbar with first web-browsing controls, a first panel within the window that includes a topology of a network including the network entities as a collapsible folder structure, and a second panel within the window including a selected sub-plurality of the network entities displayed within the first panel such that each network entity of the selected sub-plurality is displayed as an object interconnected to other objects representing other network entities of the selected sub-plurality by lines; and, embedded web browsing means separate from the application means for displaying a third panel within the window including a second toolbar with second web-browsing controls, where at least some of the second web-browsing controls are identical to the first web-browsing controls, and a text box allowing for independent navigation to a different network entity;

wherein responsive to the application means detecting a selection of a given object of the objects within the second panel, the application means is to communicate a reference to the network entity represented by the given object to the embedded web browsing means;

the embedded web browsing means is to retrieve browser-compatible data from the network entity represented by the given object and is to render the browser-compatible data within the third panel; and wherein responsive to the embedded web browsing program detecting a selection of a given element within the third panel, the embedded web browsing program is to communicate the selection of the given element to the application program, the given element corresponding to a given network entity; and, the application program is to modify the display of at least the object representing the given network entity within the second panel.

11. The system of claim 10, wherein the application means is to modify the display of at least the object representing the given network entity within the second panel by visually changing an appearance of at least the object within the second panel to indicate that the given network entity is in a selected state.

12. The system of claim 10, wherein the application means is to modify the display of at least the object representing the given network entity within the second panel by centering at least the object within the second panel.

* * * * *